(12) United States Patent
Vitoorapakorn et al.

(10) Patent No.: US 7,125,194 B2
(45) Date of Patent: Oct. 24, 2006

(54) FASTENING ASSEMBLY FOR SECURING A BED LINER TO A TRUCK BED

(75) Inventors: Ekawat Vitoorapakorn, Changwad Rayong (TH); Supawadee Vitoorapakorn, Changwad Samutprakarn (TH)

(73) Assignee: Aeroflex International Co., Ltd., Changwad Rayong (TH)

( * ) Notice: Subject to any disclaimer, the term of this patent is extended or adjusted under 35 U.S.C. 154(b) by 53 days.

(21) Appl. No.: 10/802,703

(22) Filed: Mar. 17, 2004

(65) Prior Publication Data

US 2004/0212209 A1  Oct. 28, 2004

(30) Foreign Application Priority Data

Mar. 18, 2003  (TH)  ............................... 0303000218

(51) Int. Cl.
*F16B 7/04*  (2006.01)
(52) U.S. Cl. .................................................... 403/373
(58) Field of Classification Search ................ 403/373, 403/408.1; 24/514, 516, 525, 265 CD; 224/403; 296/39.2
See application file for complete search history.

(56) References Cited

U.S. PATENT DOCUMENTS

| | | | |
|---|---|---|---|
| 4,595,229 A | 6/1986 | Wagner | |
| 4,659,133 A | 4/1987 | Gower | |
| 4,740,026 A | 4/1988 | Wagner | |
| 4,750,776 A | 6/1988 | Barben | |
| 4,796,942 A | 1/1989 | Robinson et al. | |
| 4,850,633 A * | 7/1989 | Emery ........................ | 296/39.2 |
| 4,906,040 A | 3/1990 | Edwards | |
| 4,953,820 A * | 9/1990 | Yoder ........................... | 24/489 |
| 5,046,775 A | 9/1991 | Marcum, Jr. et al. | |
| 5,100,193 A | 3/1992 | Oprea et al. | |
| 5,180,263 A | 1/1993 | Flowers, Jr. | |
| 5,228,739 A * | 7/1993 | Love ..................... | 296/100.02 |
| 5,267,820 A | 12/1993 | Sturtevant | |
| 5,360,250 A | 11/1994 | Wood | |
| 5,364,150 A | 11/1994 | Cochran et al. | |

(Continued)

FOREIGN PATENT DOCUMENTS

AU  618930  1/1992

(Continued)

OTHER PUBLICATIONS

U.S. Appl. No. 10/233,758, filed Sep. 2002, Vitoorapakorn et al.

(Continued)

*Primary Examiner*—Daniel P. Stodola
*Assistant Examiner*—Joshua Kennedy
(74) *Attorney, Agent, or Firm*—Akin Gump Strauss Hauer & Feld, LLP (57) ABSTRACT

A fastening assembly for a pickup truck bed liner including a foldable tie-down ring and a supporting plate. A pickup truck bed includes an inwardly extending bed rail. The bed liner includes circular open holes in its side walls. When the liner is placed on the truck bed, the perimeter of the holes cross the lower edge of the bed rail. The fastening assembly includes a foldable tie-down ring assembly, screw and supporting plate. The foldable tie-down ring assembly includes a base member, an elastic pad, a foldable tie-down ring, a clamp member, a rubber pad and an anti-loosening ring or plastic. The principle for fastening is to fasten the screw so that the clamp member exerts clamp force on the base member with the bed liner and bed rail therebetween. The installed fastening assembly and bed liner results in the bed liner being fastened to the truck bed.

10 Claims, 11 Drawing Sheets

U.S. PATENT DOCUMENTS

| | | |
|---|---|---|
| 5,372,397 A | 12/1994 | Arndt |
| 5,738,471 A | 4/1998 | Zentner et al. |
| RE36,073 E | 2/1999 | Kremer et al. |
| 6,039,520 A * | 3/2000 | Cheng ........................ 410/106 |
| 6,203,090 B1 | 3/2001 | Vitoorapakorn |
| 6,256,844 B1 * | 7/2001 | Wheatley ................ 24/265 CD |
| 6,350,089 B1 * | 2/2002 | Tekavec ..................... 410/106 |
| 6,565,300 B1 | 5/2003 | Herring |

FOREIGN PATENT DOCUMENTS

| | | |
|---|---|---|
| TH | 10615 | 10/1999 |

OTHER PUBLICATIONS

U.S. Appl. No. 10/400,355, filed Mar. 2003, Vitoorapakorn et al.

* cited by examiner

PRIOR ART

FASTENING ASSEMBLY FOR SECURING A BED LINER TO A TRUCK BED

BACKGROUND OF THE INVENTION

This invention relates to bed liner and, more particularly to a fastening assembly for fastening a bed liner to a pickup truck bed without drilling holes in the truck bed. The bed liner includes foldable tie-down rings attached thereto.

There are several patents directed to bed liners, such as U.S. Pat. No. 5,267,820 issued to Thomas Sturtevant on Dec. 7, 1993, which discloses a fastening assembly with a support member, face plate and trough-shaped wall for supporting a clamp member that can move linearly. The clamp member can twirl within the trough-shaped wall structure in order to turn the clamp arm upward to the position required for clamping on the downward lip of the bed rail. When a screw is fastened into the trough-shaped wall in a threaded hole of the clamp member, the screw twirls and causes the clamp arm to twirl. This causes the clamp member to move linearly within the trough to the position required for clamping on the downward lip of the bed rail. The fastening assembly is a completely assembled apparatus which can be installed into a circular open hole on the side walls of a pickup truck bed liner after placing the liner on the truck bed.

A disadvantage of the fastener assembly of U.S. Pat. No. 5,267,820 when compared to the present invention is that the fastening assembly of U.S. Pat. No. 5,267,820 has been designed only to hold bed liner to the truck bed without a tie-down ring attached. After installing the bed liner with the fastener assembly pursuant to U.S. Pat. No. 5,267,820, the bed liner shall cover the truck bed including the original tie-down rings since pickup trucks normally have tie-down rings attached to the truck beds. If tie-down rings are required, it is necessary to drill holes in the liner of the device described in U.S. Pat. No. 5,267,820. These holes must be big enough to reach the original tie-down rings by hand. Such big holes have the disadvantage of allowing water, rock and/or sand to enter.

Another retainer apparatus pursuant to U.S. Pat. No. 6,203,090 B1 and Thai Patent No. 10615 discloses a bed liner for a pickup truck bed with an inwardly or outwardly extended bed rail. U.S. Pat. No. 6,203,090 B1 and Thai Patent No. 10615 are incorporated herein by reference. The pickup truck bed of these patents has a plurality of bed holes and the bed liner has a plurality of liner holes. The retainer apparatus includes a front tie-down ring retaining plate for positioning between the pickup truck bed and the bed liner. The front tie-down ring retaining plate has a first end and an opposing second end. The first end has at least one hole therethrough for alignment with one of the bed holes. The first end is secured to one of the bed holes. The second end has at least one hole therethrough for alignment with one of the liner holes. The second end is secured to one of the liner holes. The apparatus also includes a rear tie-down ring retaining plate for positioning between the pickup truck bed and the bed liner. The rear tie-down ring retaining plate has a first end and an opposing second end. The first end has at least one hole therethrough for alignment with one of the bed holes. The first end is secured to one of the bed holes. The second end has at least one hole therethrough for alignment with one of the liner holes. The second end is secured to one of the liner holes. The tie-down rings are attached to the bed liner in an alignment with the front and rear tie-down ring retaining plates. The tie-down ring is an accessory with a base member which has a plurality of holes for alignment with at least one of the bed liner holes and consists of a fold down ring with a fulcrum at the base member and the fold down ring has a through hole.

A disadvantage of the retainer apparatus of U.S. Pat. No. 6,203,090 B1 and Thai Patent No. 10615 is that in case there are no holes in the truck bed, this apparatus can not be secured to the bed liner.

Further, the fastening assembly pursuant to the present invention has duly cross-licensed for the claim under the U.S. Pat. No. 6,203,090 B1 and Thai Patent No. 10615 with respect to the foldable tie-down ring.

The present invention relates to the fastening assembly for securing a plastic bed liner to a pickup truck bed without drilling. This invention has been designed to solve problems regarding a mechanism for securing a bed liner to a pickup truck bed as aforesaid and to add convenience or utility from the foldable tie-down rings.

BRIEF SUMMARY OF THE INVENTION

The preferred embodiment of the present invention is directed to an apparatus for holding a plastic bed liner to a pickup truck bed with an installation method which does not require drilling in the pickup truck bed or cause damage to the pickup truck bed. The preferred embodiment also provides foldable tie-down rings for tie up loads. This preferred embodiment of the invention has been developed from an idea that fasteners should be capable of holding bed liners to a pick up truck bed strongly enough to stand tension from heavy use of the tie-down rings due to high load.

Another object of the preferred embodiment of the present invention is to provide a number of foldable tie-down rings for tying loads. The tie-down rings may be in various shapes which are designed for tying, hanging or hooking by ropes to hold loads and must be strong enough to stand tension from heavy use of the tie-down rings due to high loads.

Moreover, the preferred embodiment of the present invention also includes improvements and modifications to the foldable tie-down rings in order to use these rings for such applications as canopy holders, multi purpose box holders or load blocking beam holders which do not require drilling in the pickup truck bed and are strong enough to stand tension from heavy use for such purpose while being able to hold such apparatus securely.

The fastening assembly pursuant to the preferred embodiment of the present invention is applicable to pickup truck beds with inward extending bed rails. The bed liner used pursuant to the preferred embodiment of the invention has been drilled to provide circular open holes in the side walls at the position which, when the liner is placed on the truck bed, the perimeter of the holes shall cross the lower edge of the inward extended bed rail and the diameter of the holes shall be sufficient for insertion of a clamp member of a foldable tie-down ring assembly.

The fastening assembly pursuant to the preferred embodiment of the present invention consists of a foldable tie-down ring assembly, a screw and a supporting plate. The foldable tie-down ring assembly is comprised of a base member, an elastic pad for the base member, a foldable tie-down ring, a clamp member, a rubber pad for the clamp member and an anti-loosing plastic or plastic lock washer.

Figure 5:
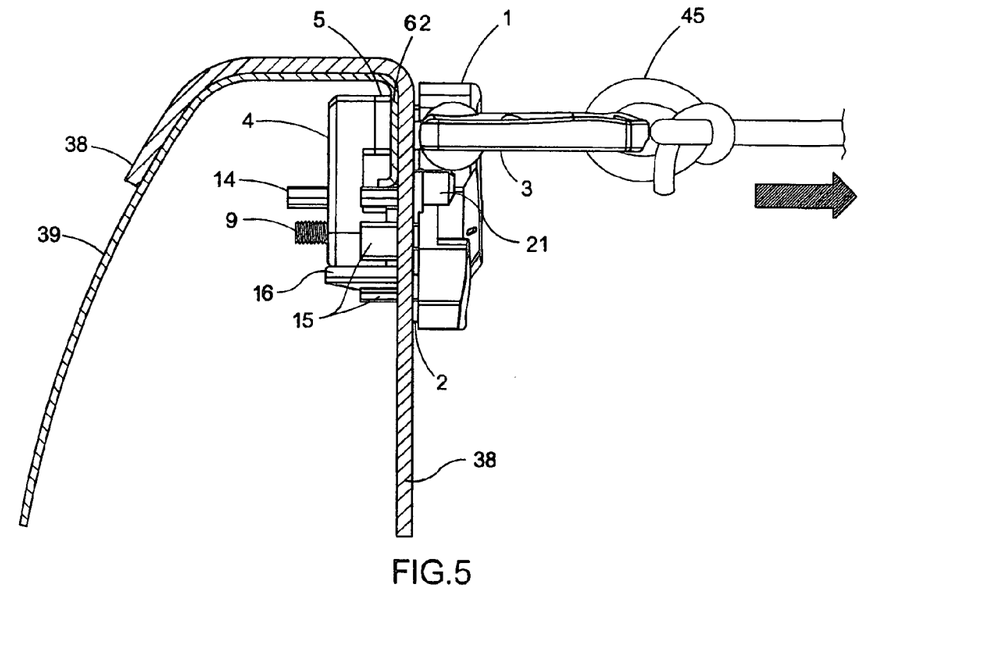
FIG. 5 is the side view of the fastening assembly shown in FIG. 3, with no supporting plate and tension applied by a rope 45 which is tied to the tie-down ring 3.
Figure 6:
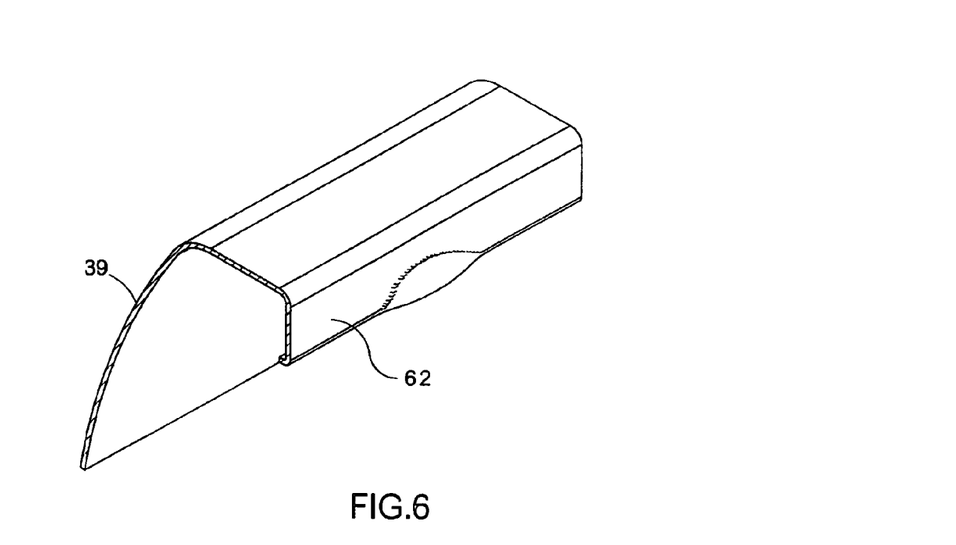
FIG. 6 is torsion damage at a bed rail of the bed liner of FIG. 1, which resulted from high tension from the clamp member without using the supporting plate.

By using only the foldable tie-down ring assemblies and screws, a bed liner can be fastened to the truck bed. The principle for securing is that the screw shall be fastened to press the clamp member to the base member, with the bed liner and the bed rail in between. In case a supporting plate, which is attached to the inner surface of the bed rail, is also applied, the tie-down ring shall be used for tying a heavy load without causing distortion to the bed rail. The effects from use and non-use of the supporting plate when heavily utilizing the tie-down ring can be compared. For example, in a case where no supporting plate is utilized (FIG. 5) and a rope 45 is attached to the tie-down ring that is in turn attached to the bed rail, a certain strain will be reached where a torsion load in the bed rail will deform and dimple the bed rail (FIG. 6). However, if a supporting plate constructed of a sturdy material is anchored to the bed rail in conjunction with the tie-down ring and the same strain level is applied to the bed rail, there is no distortion in the bed rail. This is a result of the supporting plate which spreads pressure over the surface of the bed rail resulting in less pressure per each unit of area on the bed rail.

This invention is generally categorized under the mechanical engineering section with respect to a fastening assembly for pickup bed liners. The bed liners use a foldable tie-down ring assembly and supporting plate.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment that is presently preferred. It should be understood, however, that the application is not limited to the precise arrangements and instrumentalities shown.

In the drawings:

FIG. 4.1 is a fastener assembly of U.S. Pat. No. 5,267,820, the purpose of which is only to secure the bed liner to the pickup truck bed;

FIG. 4.2 is a top perspective view of a foldable tie-down ring assembly of the fastening assembly shown in FIG. 2 in a lifted position for tying loads;

FIG. 8.1 is a rear, exploded perspective view of the foldable tie-down ring assembly of FIG. 4.2;

FIG. 8.2 is a rear perspective view of a convex surface 34 of a lowest edge of a clamp 4 of the fastening assembly shown in FIG. 4.2;

FIG. 8.3 a rear perspective view of a curved surface 35 of a lower part of an extended plate at a base member 1 of the fastening assembly shown in FIG. 4.2;

FIG. 9.1 is a front perspective view of a supporting plate 7 of the fastening assembly shown in FIG. 2;

FIG. 9.2 is a left-side elevational view of the supporting plate 7 shown in FIG. 9.1;

FIG. 11.1 is the cross sectional view of a socket center 36 of the first part of the rotating axis socket 11 shown in FIG. 10;

FIG. 11.2 is the side view of a pivot axis 37 of the foldable tie-down ring shown in FIG. 10, which precisely overlays the socket center 36 of the first part of the rotating axis socket 11;

FIG. 12.1 is a side view of the foldable tie-down ring assembly shown in FIG. 4.2 with the tie-down ring 3 in the only position at which the lock rotating axis 26 can be inserted or removed, in accordance with the direction of the arrow shown in the figure;

FIG. 12.1A is an enlarged cross-sectional view of the lock rotating axis 26 when placed in the first part of the rotating axis socket 11 and the tie-down ring 3 being in the position shown in FIG. 12.1;

FIG. 12.2 is a side view of the foldable tie-down ring assembly with the tie-down ring 3 in the lifted position as is shown in FIGS. 4.2 and 5;

FIG. 12.2A is an enlarged cross-sectional view of the lock rotating axis 26 placed in the first part of the rotating axis socket 11 and the tie-down ring 3 in the position shown in FIG. 12.2;

FIG. 12.3 is a side view of the foldable tie-down ring assembly shown in FIG. 4.2 with the tie-down ring 3 folded into the base member 1;

FIG. 12.3A is an enlarged cross-sectional view of the lock rotating axis 26 placed in the first part of the rotating axis socket 11 and the tie-down ring 3 in the position shown in FIG. 12.3;

FIG. 13.1 is the front perspective view of the foldable tie-down ring assembly shown in FIG. 4.2 with the tie-down ring 3 folded into the base member;

FIG. 13.2 is a rear perspective view of the foldable tie-down ring assembly shown in FIG. 13.1;

FIG. 14.1 is a rear perspective view of the foldable tie-down ring assembly shown in FIG. 13.1 with a partial cross-sectional view of an extended U-shaped part 20 of a base member elastic pad 2 with a blocking rotating axis 24 preventing the base member elastic pad 2 from being removed from its position;

FIG. 14.2 is an enlarged view of the partial cross-sectional view of the foldable tie-down ring assembly shown in FIG. 14.1;

FIG. 15.1 is a front perspective view of the completely assembled foldable tie-down ring assembly shown in FIG. 4.2;

FIG. 15.2 is a rear perspective view of the completely assembled foldable tie-down ring assembly shown in FIG. 4.2;

FIG. 16.1 is a top perspective view of the bed liner positioned in a pickup truck bed in accordance with a preferred embodiment of the present invention;

FIG. 16.2 is an enlarged cross-sectional view of a portion of the bed liner positioned in the pickup truck bed as is shown in FIG. 16.1;

FIG. 18.1 is a perspective view of the supporting plate 7 completely installed relative to the bed rail shown in FIG. 17;

FIG. 18.2 is a perspective view of a spring clip 43 clamping and pressing the support plate 7 to an inner surface of the bed rail upon installation of the support plate 7 relative to the bed rail as is shown in FIG. 18.1;

DETAILED DESCRIPTION OF THE INVENTION

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the preferred fastening assembly for securing a bed liner to a truck bed and designated parts thereof. The terminology includes the above-listed words, derivatives thereof and words of similar import.

Figure 1:
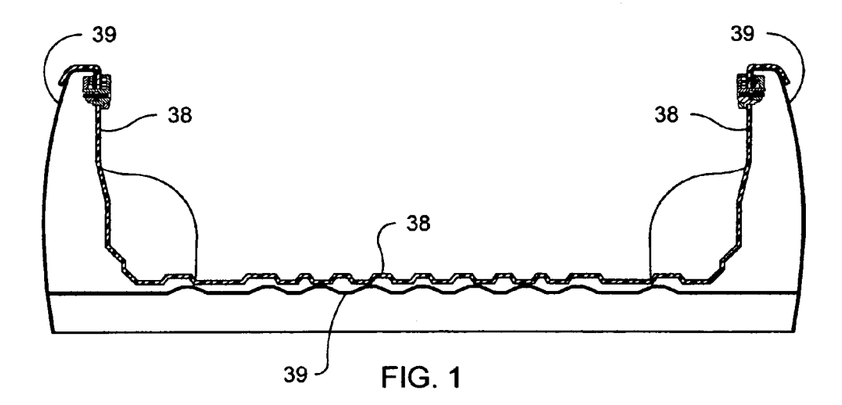
FIG. 1 is a cross-sectional view of the bed liner and fastening assembly of the preferred embodiment of the present invention secured to a pickup truck bed taken along line 1—1 of FIG. 16.1.
Figure 2:
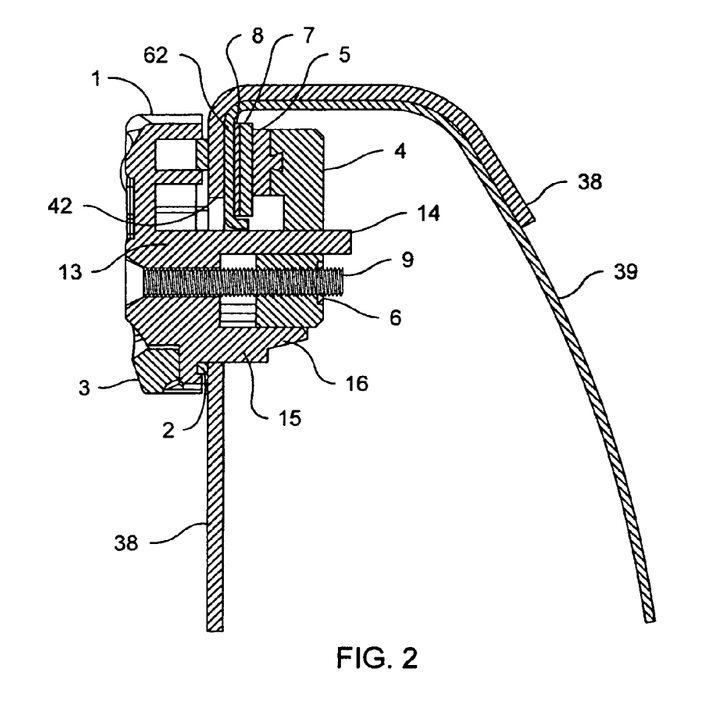
FIG. 2 is an enlarged, partial cross-sectional view of a portion of the bed liner and fastening assembly of FIG. 1.
Figure 3:
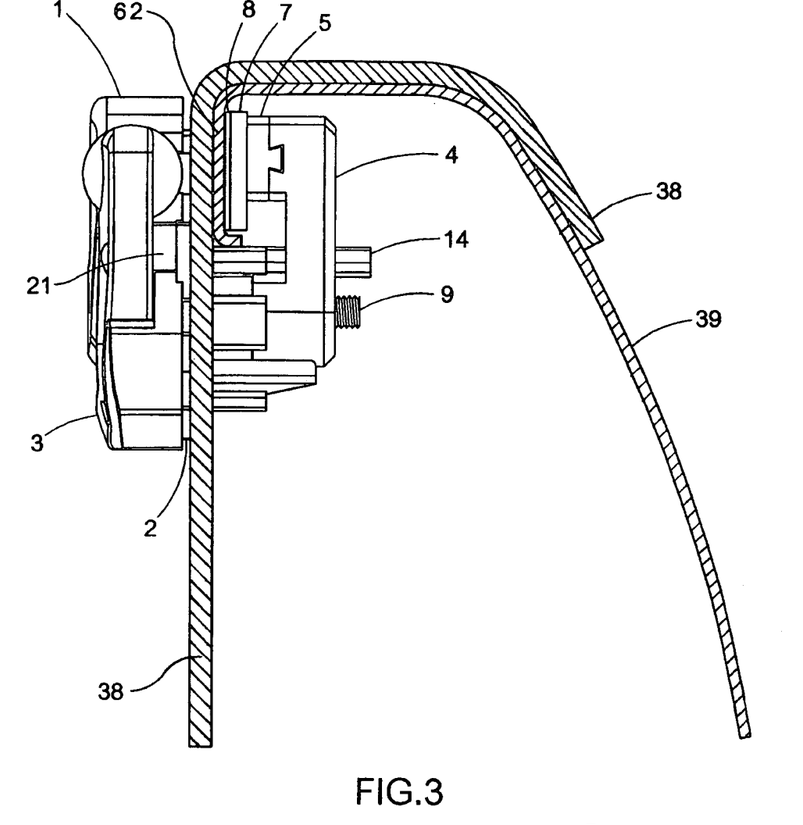
FIG. 3 is a side view of the fastening assembly of FIG. 1, securing the bed liner to the pickup truck bed pursuant to the present invention.

Referring to FIGS. 1–3, the preferred embodiment of the present invention includes a fastening assembly for a pickup truck bed liner 38 comprising a foldable tie-down ring assembly and supporting plate 7. An objective of the fastening assembly is to secure the bed liner 38 to the pickup truck bed 39 and to provide foldable tie-down rings 3 with a rotating axis attached to a base member 1.

Figure 7:
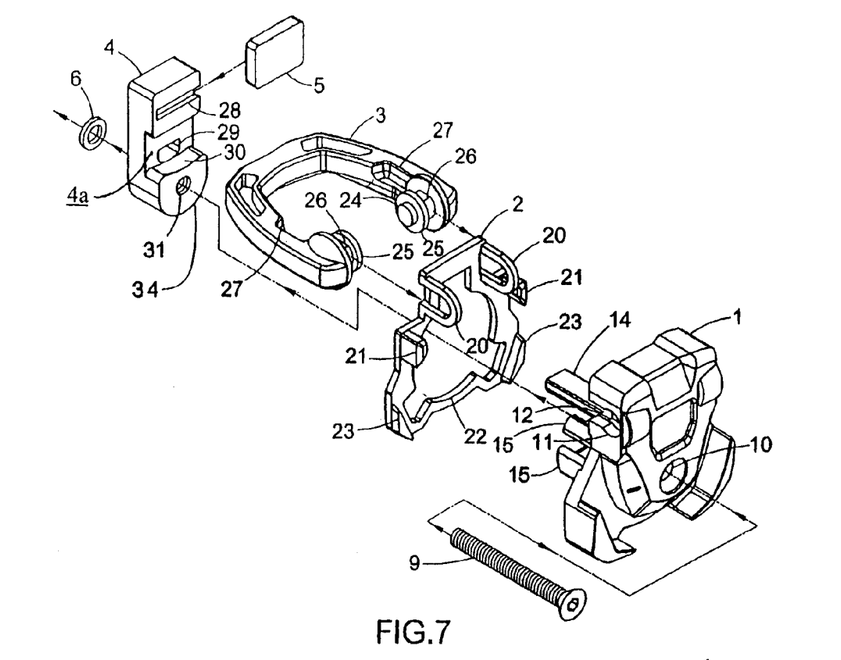
FIG. 7 is a front, exploded perspective view of the foldable tie-down ring assembly shown in FIG. 4.2.
Figure 81:
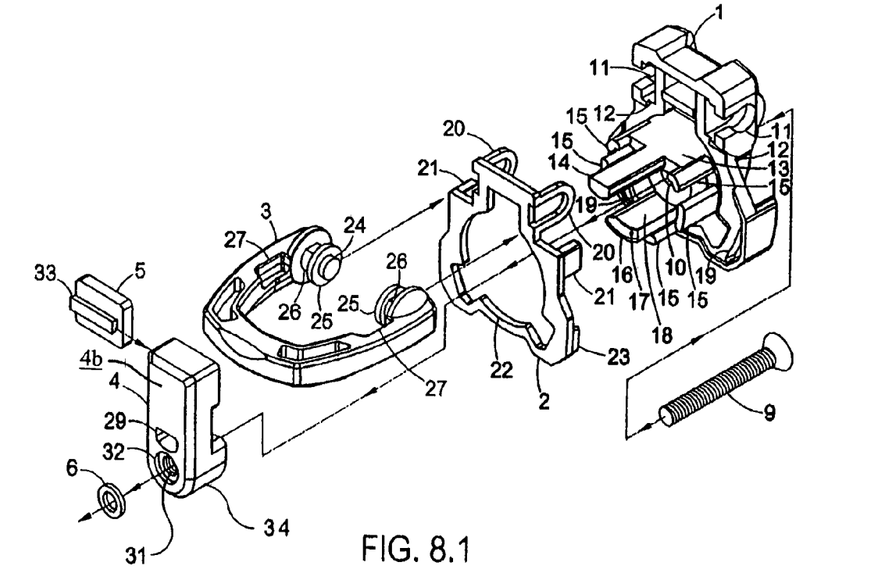

Referring to FIGS. 2, 3, 4.2, 5, 7, 8.1 and 8.3, the base member 1 works as a plate for pressing on a bed rail 62 of the pickup truck bed 39 and also serves as a base for attaching the foldable tie-down ring 3, having the front and rear appearance as follows:

Referring to FIGS. 7 and 8.1, on the front of the base member 1 there is a hole 10 for insertion of a screw 9. On the back of the base member 1 at the upper edge there are number of cylindrically-shaped sockets, divided into two parts, i.e. a first part is a rotating axis socket 11 that supports a lock rotating axis 26 of the tie-down ring 3 and a second part is a cylindrically-shaped socket 12 for insertion of a blocking rotation axis 24, which is also part of the tie-down ring 3. The tie-down ring 3 has a collar 25 that is preferably positioned between the blocking rotation axis 24 and the lock rotating axis 26. An elastic pad 2 is positioned between the base member 1 and the truck bed liner 38 in the assembled position to protect the bed liner 38 from damage. The elastic pad 2 includes extended U-shaped parts 20 that are positioned in the sockets 12 in the assembled position and accommodate the assembly of the tie-down ring 3 to the base member 1. The diameter of the rotating axis socket 11 is slightly longer than that of the lock rotating axis 26 so that the lock rotating axis 26 can be rotated easily in the rotating axis socket 11.

Figures 161, 162:
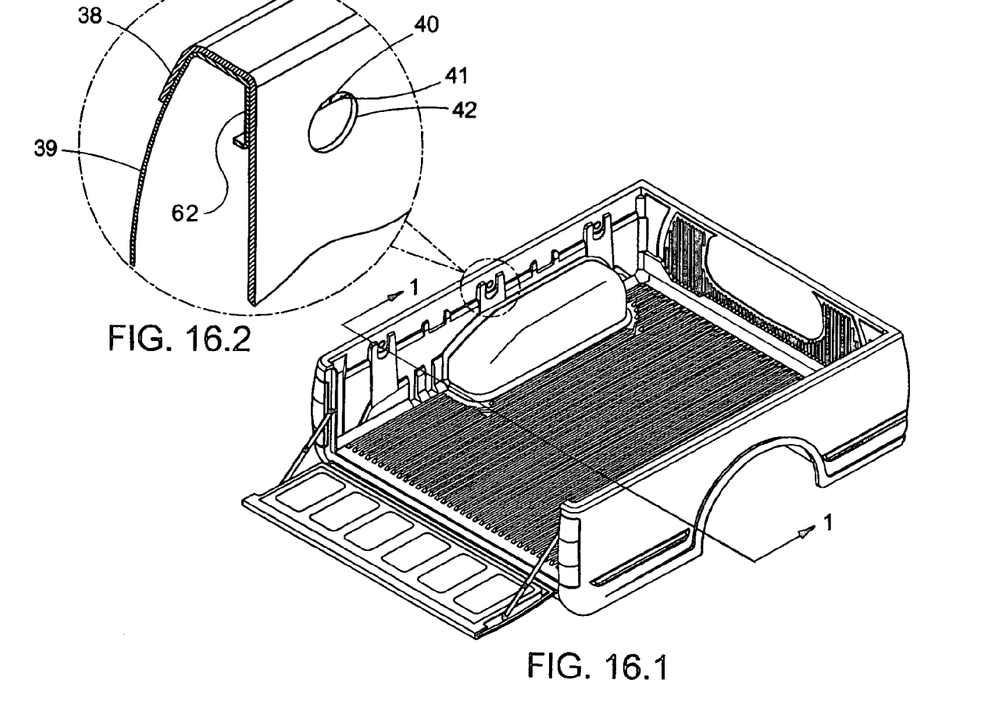
Figure 181:
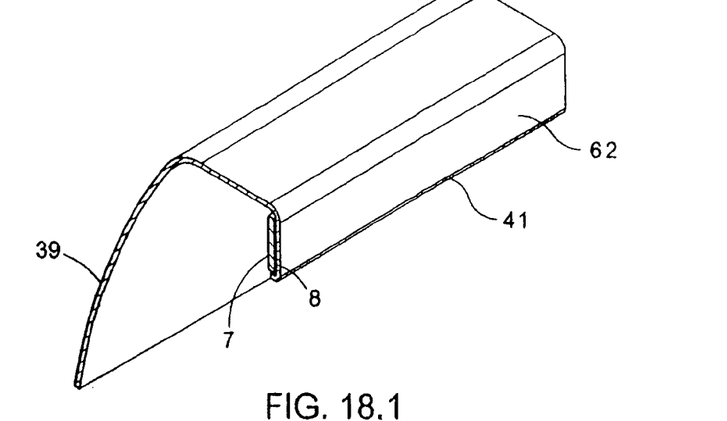
Figure 182:
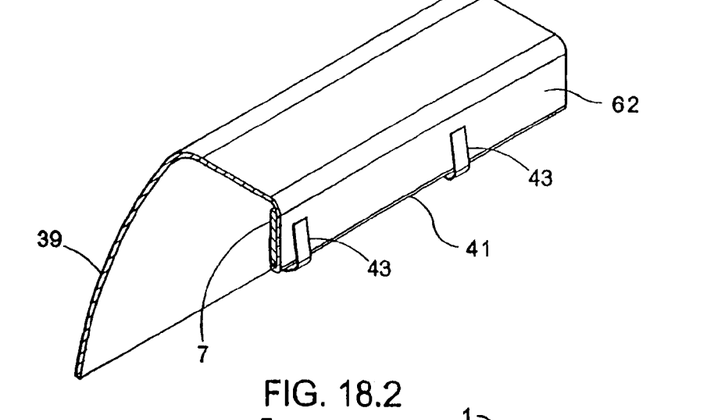

Referring to FIGS. 7, 8.1 and 16.2, a number of contact rods 15 extend from a rear middle of the base member 1 and are placed around the open hole 10 of the base member 1. The rods 15 are preferably placed and contact the perimeter of an open hole 42 in the bed liner 38 in an assembled condition so that the tie-down ring assembly is able to stand on the bed liner 38. The base member 1 is not limited to the inclusion of the rods 15 and may be located and positioned relative to the hole 42 in nearly any manner that would be obvious to one having ordinary skill in the art.

Referring to FIGS. 7–8.3 and 16.1–17, above the open hole 10 at a rear of the base member 1 there is an contact plate 13 extending therefrom with a preferably flat upper surface for placing in contact with the lower edge 41 of the bed rail 62 and preventing the tie-down ring assembly from rotating when it is mounted to the bed liner 38 and rail 62. The lower surface of the contact plate 13 preferably includes a convex surface 35, as shown in FIG. 8.3 for precise contact with the concave surface 30 of the clamp member 4 in order to absorb forces passed from the concave surface 30. The contact plate 13 is not limited to the above-described configuration and may take on nearly any shape and configuration at its rear that permits the base member 1 to be mounted to the bed liner 38 and rail 62 to hold the bed liner 38 to the pickup truck bed 39 in the assembled condition.

In the preferred embodiment, above the open hole 10 and extending from the contact plate 13 there is a direction control rod 14 which is longer than the contact plate 13. The direction control rod 14 preferably has a generally square-like cross-section with a lower arcing surface but may have nearly any shaped cross-section as will be understood by one having ordinary skill in the art. The control rod 14 is removably insertable into and potentially through a hole 29 of the clamp member 4 in order to control the moving direction of the clamp member 4. The engagement of the control rod 14 with the hole 29 also orients the clamp member 4 relative to the base member 1 and the elastic pad 2 in the assembled condition. The hole 29 extends through the clamp member 4 from a first side 4a to a second side 4b. The first side 4a generally faces the base member 1 in the assembled position and the second side generally faces away from the base member 12 in the assembled position.

In the preferred embodiment, below the open hole 10, there is a force absorbing rod 16 extending rearwardly from the base member 1 with a concave surface 18 for precise contact with a convex surface 34 at the lower part of the clamp member 4. The force absorbing rod 16 preferably supports the clamp member 4 in an upright position and absorbs forces passed from the convex surface 34 if and when a heavy load is applied at the tie-down ring 3. The base member 1 is not limited to the inclusion of the force absorbing rod 16 or to the inclusion of the concave surface 18. The force absorbing rod 16 and concave surface 18 may be eliminated and forces may be absorbed by an alternative arrangement, which would be obvious to one having ordinary skill in the art.

Figure 83:
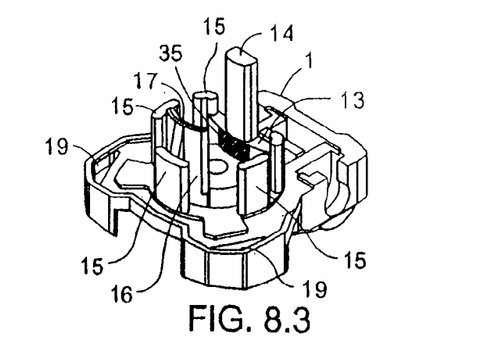
Figure 91:
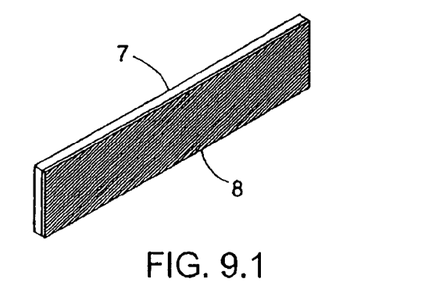
Figure 92:
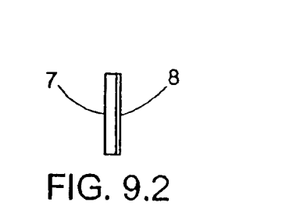

Referring to FIGS. 8.1 and 8.3, in the preferred embodiment, at lower left and right corners of the base member 1 there are lock sockets 19 that removably receive extended locks 23 of the elastic pad 2. The lock sockets 19 preferably frictionally engage the extended locks 23 to align and engage the elastic pad 2 to the base member 1. The base member 1 is not limited to being mounted to the elastic pad 2 through the lock sockets 19 and the extended locks 23. For example, the elastic pad 2 may be adhesively bonded, clamped, fastened or likewise mounted to the base member 1 using a mounting mechanism or method that would be obvious to one having ordinary skill in the art. However, the lock sockets 19 preferably engage the extended locks 23 with sufficient friction so that the elastic pad 2 is difficult to remove from the base member 1.

The edge of the force absorbing rod 16 is preferably chamfered in a curved surface 17 at its end so that when the clamp member 4 moves toward the base member 1, it will not hit the edge of the force absorbing rod 16.

Referring to FIGS. 2, 5–8.1 and 19, in the preferred embodiment, the elastic pad 2 serves as a buffer between the base member 1 and the bed liner 38. When the fastening assembly is installed, the elastic pad 2 is preferably placed between the base member 1 and the bed liner 38 and works as an insulator preventing water from entering the open hole 42 in the bed liner 38.

Referring to FIGS. 3, 4.2, 5, 7, 8.1, 12.1, 12.2, 12.3 and 13.2, the elastic pad 2 preferably includes a number of the U-shaped parts 20 extending forwardly therefrom that fit into to the cylinder sockets 12 of the base member 1. There are also a number of extended locks 21 extending forwardly from the elastic pad 2 in the preferred embodiment that extend along a side of the base member when the elastic pad 2 is mounted to the rear of the base member 1 and fit into locking sockets 27 on a rear side of the tie-down ring 3 when the tie-down ring is in a folding position. The extended locks 21 preferably fit into the locking sockets 27 of the tie-down ring 3 with sufficient friction to releasably lock or hold the tie-down ring 3 to the base member when the tie-down ring 3 is in the folding position. An open hole 22 is preferably centrally located in the elastic pad 2 and may take on nearly any shape that does not block the insertion of the contact rods 15 therethrough and accommodates the extended locks 23 that preferably perfectly fit into the lock sockets 19. The open hole 22 also preferably accommodates the releasable mounting of the clamp member 4 to the base member 1 as will be described in greater detail below.

Referring to FIGS. 4.2, 5, 7, 8.1, 12.1–13.2, 15.1 and 15.2, the foldable tie-down ring 3 preferably has a generally U-shape, anchor-shape or any shape for the purpose of tying, hanging or hooking rope for tying a load thereto. At the upper edge of the tie-down ring 3, there is a three-part rotating axis. Each part of the axis has different functions.

Figure 10:
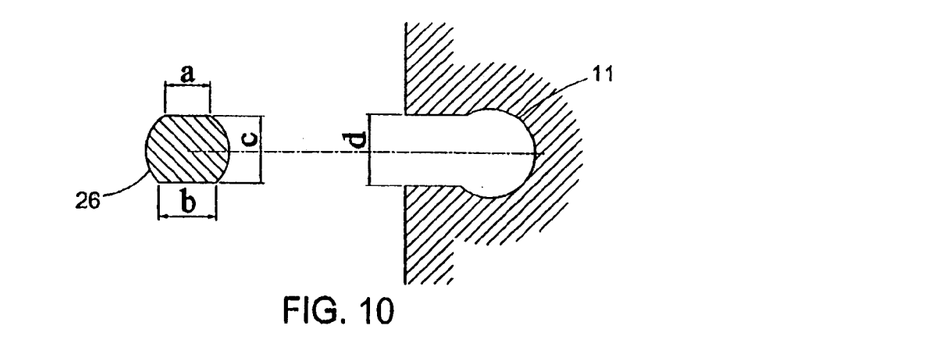
FIG. 10 is an enlarged cross-sectional view of a lock rotating axis 26 and a first part of a rotating axis socket 11 of the foldable tie-down ring assembly shown in FIG. 4.2.
Figure 12:
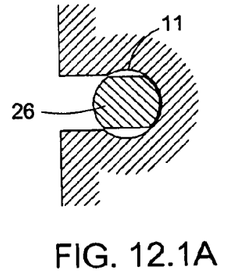
Figure 111:
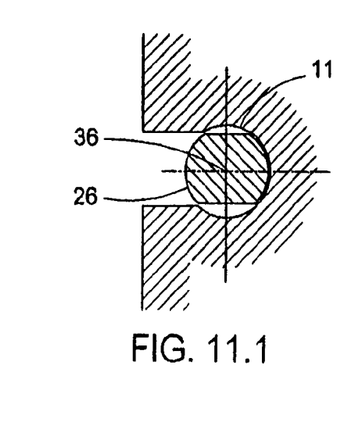
Figure 112:
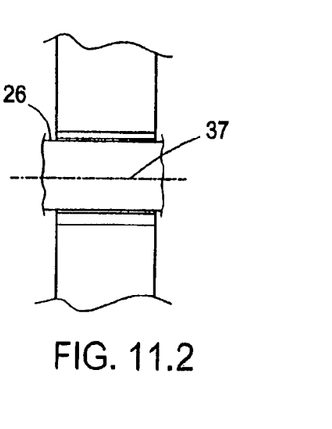
Figures 121, 122:
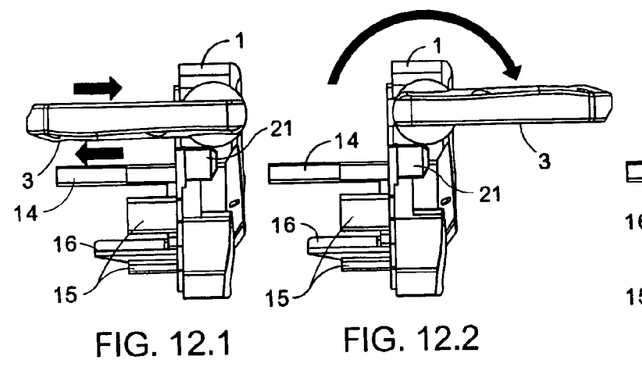
Figure 123:
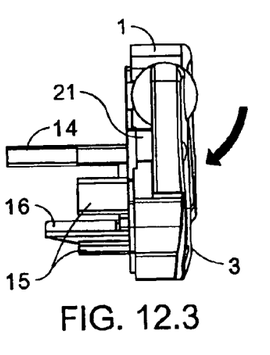
Figure 131:
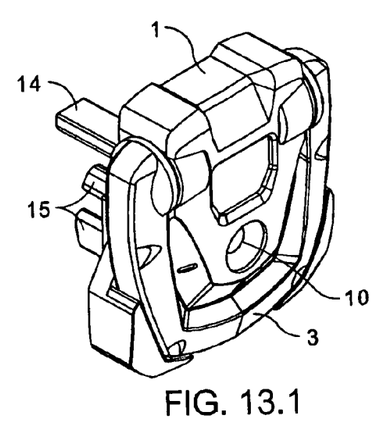
Figure 132:
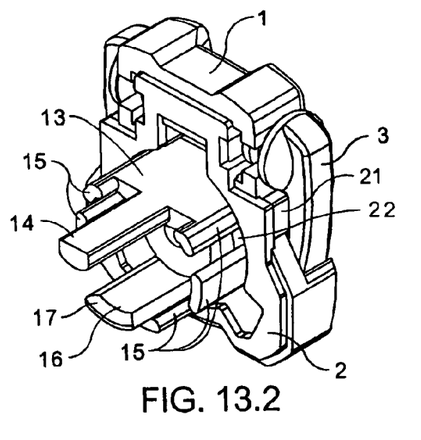
Figure 141:
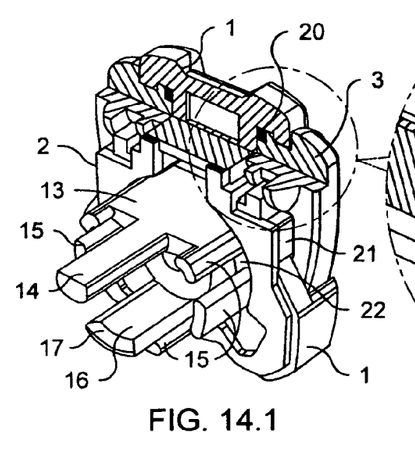
Figure 142:
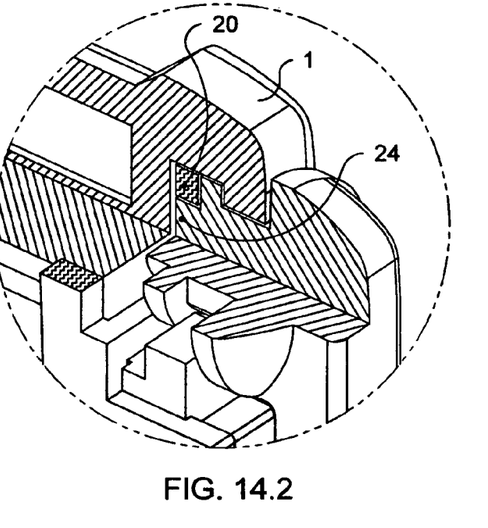
Figure 151:
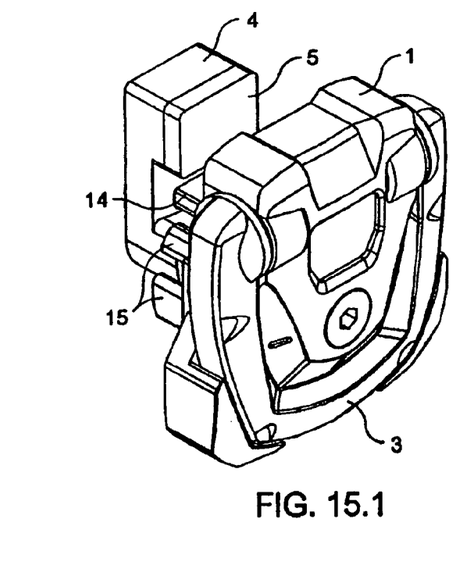
Figure 152:
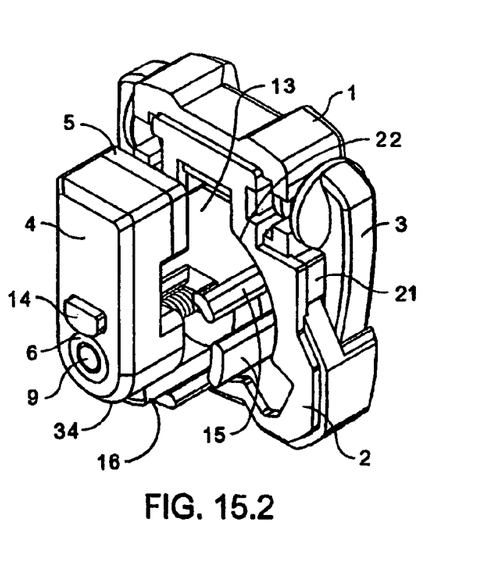

The first part of the axis is the lock rotating axis 26 that preferably has a circular cross section that has been unevenly beveled on its upper and lower side. Referring specifically to FIG. 10, the upper side of the lock rotating axis 26 is beveled at the length a and the lower side is beveled at the length b. The beveling of the opposite upper and lower edges of the lock rotating axis 26 results in a thickness c between the edges. The lock rotating axis 26 serves in holding the foldable tie-down ring 3 in the axis socket 11 unless the tie-down ring 3 is in a position to be removed horizontally from the back side of the base member 1. Referring to FIG. 11.1 and 12.2, in the assembled condition, the lock rotating axis 26 of the tie-down ring 3 is pivotable about a pivot axis 37 which precisely overlays the center 36 of the axis socket 11.

Referring to FIGS. 7, 8.1 and 10–13.2, since the lock rotating axis 26 is an integral part of the foldable tie-down ring 3, the assembly of the foldable tie-down ring 3 to the base member 1 can be done quickly.

The second part of the axis of the tie-down ring 3 is the collar 25 that preferably has a circular cross section and serves as side tension absorbance due to loads that are lateral to the foldable tie-down ring 3 from the left or right side so that both sides of the tie-down ring 3 are not broken apart when subjected to side loads. The collar 25 is preferably positioned within the cylinder socket 12 when the tie-down ring 3 is mounted to the base member 1.

The third part of the axis of the tie-down ring 3 is the blocking rotating axis 24 that preferably has a circular cross section and serves as a blockage to the extended U-shaped part 20 to prevent the elastic pad 2 from falling off the base member 1. As was described above, the elastic pad 2 is also preferably removably mounted and held relative to the base member 1 by engagement between the extended locks 23 and the lock sockets 19.

As was described above, the tie-down ring 3 also includes a number of sockets 27 that preferably perfectly fit with the extended locks 21 of the elastic pad 2 to provide friction when the tie-down ring 3 is pulled or folded down to its folding position. The frictional locking or holding of the tie-down ring 3 to the base member 1 by frictional engagement between the sockets 27 and extended locks 21 preferably prevents the tie-down ring 3 from shaking loose from the base member 1 when the truck is moving.

Referring to FIGS. 4.2–8.3, the clamp member 4 preferably includes a locking trough 28 on its front face that has a generally trapezoidal-shape that removably engages an extended locking rod 33 of a pad 5. The pad 5 is preferably constructed of a polymeric or rubber material but is not so limited. The pad 5 may be constructed of nearly any material that is able to take on the general shape of the pad 5 and withstand the normal operating conditions of the pad 5. The extended locking rod 33 also preferably has a generally trapezoidal-shaped cross-section. The pad 5 is preferably removably engageable with the clamp member 4 through sliding engagement of the extended locking rod 33 in the locking trough 28. The locking rod 33 and locking trough 28 preferably have sufficient friction to prevent the rubber pad 5 from being easily removed from the locking trough 28.

There is preferably a hole 29 generally centrally located in the clamp member 4 that is slightly bigger than the direction control rod 14 and has a similar cross-sectional shape to the direction control rod 14. The direction control rod 14 of the base member 1 is insertable into the hole 29 in the preferred embodiment to control motion of the clamp member 4 along the direction control rod 14 and to aid in locating the clamp member 4 relative to the base member 1.

The clamp member 4 also preferably includes a concave surface 30 below the hole 29 that supports the convex surface 35 of the base member 1 (FIG. 8.3). The engagement of the concave surface 30 with the convex surface 35 aids in locating the clamp member 4 relative to the base member 1 but the clamp member 4 and base member 1 are not limited to the inclusion of the concave and convex surfaces 30, 35, respectively, as would be understood by one having ordinary skill in the art.

The clamp member 4 further includes an internal threaded hole 31 that is preferably positioned below the concave surface 30. The internal threaded hole 31 is used for tightening the screw 9 when the clamp member 4 is mounted to or engaged with the base member 1. The internal threaded hole 31 is not limited to being located below the concave surface 30 and may be located nearly anywhere on the clamp member 4 that enabled engagement of the screw 9 with the internal threaded hole 31.

Figure 82:
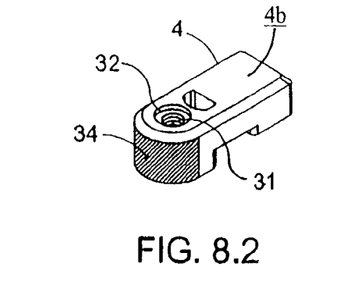

In addition, the clamp member 4 includes a convex surface 34 at its lowest edge (FIG. 8.2). The convex surface 34 preferably perfectly fits with the concave surface 18 of the force absorbing rod 16 (FIG. 8.1).

Referring to FIGS. 7–8.2, the clamp member 4 includes a crucible 32 on a rear surface that preferably surrounds the internal threaded hole 31. The crucible 32 permits placement of an anti-loosing plastic, lock washer or ring 6 therein.

Referring to FIGS. 7, 8.1 and 19–21, the rubber pad 5 preferably prevents scratches from forming on the inner surface of the bed rail 62 or the supporting plate 7 due to the clamp member 4. As was described above, the extended locking rod 33 on a rear surface of the pad 5 fits into the locking trough 28 on the clamp member 4 to hold the pad 5 relative to the clamp member 4.

The Anti-loosing plastic, lock washer or ring 6 preferably prevents the screw 9 from loosening from engagement with the clamp member 4.

The supporting plate 7 preferably has a generally rectangular shape that is complimentary to the bed rail 62. The purpose of the supporting plate 7 is to distribute compressive force from the clamp member 4 on the bed rail 62 all over a surface of the supporting plate 7 that contacts a surface of the bed rail 62.

Referring to FIGS. 16.1–23, to install the fastening assembly and bed liner 38 to the pickup truck, the supporting plate 7 is positioned at the inner side and parallel to the bed rail 62. In the preferred embodiment, a double-sided adhesive tape 8 (FIG. 18.1) is attached to the supporting plate 7 to hold the supporting plate 7 in position relative to the bed rail 62. There are other methods which may be categorized in two groups, e.g. by using material to be laid between the bed rail 62 and the supporting plate 7, such as using glue and by using material to be laid on the outer surface of the bed rail 62, such as a spring clip 43 (FIG. 18.2). An advantage of using the double side adhesive tape 8 is to prevent the supporting plate 7 from scratching the inner side of the bed rail 62.

The base member 1, foldable tie-down ring 3, clamp member 4, supporting plate 7 and screw 9 are made from sturdy material. Therefore, when assembled the fastening assembly preferably creates a strong and secure fastening with tie-down rings 3 for heavy loads.

The assembly of the foldable tie-down ring or fastening assembly starts by attaching the elastic pad 2 to the base member 1 and attaching the foldable tie-down ring 3 to the base member 1 by pushing the lock axis 26 into the first part of the socket 11, horizontally (FIG. 12.1). Thereafter, the foldable tie-down ring 3 is turned in a direction as shown in FIGS. 12.2 and 12.3. The anti-loosening lock washer or ring 6 is inserted into the crucible 32. The clamp member 4 is assembled to the base member 1 by inserting the direction control rod 14 into the hole 29 and inserting the screw 9 through the open hole 10 at the base member 1. The screw 9 is fastened into the internal threaded hole 31 and the anti-loosening lock washer or ring 6 holds the screw 9 relative to the clamp member 4 when an end of the screw 9 engages the lock washer or anti-loosening plastic 6. The pad 5 is engaged with the clamp member 4. The complete assembled is shown in FIGS. 15.1 and 15.2.

Figure 17:
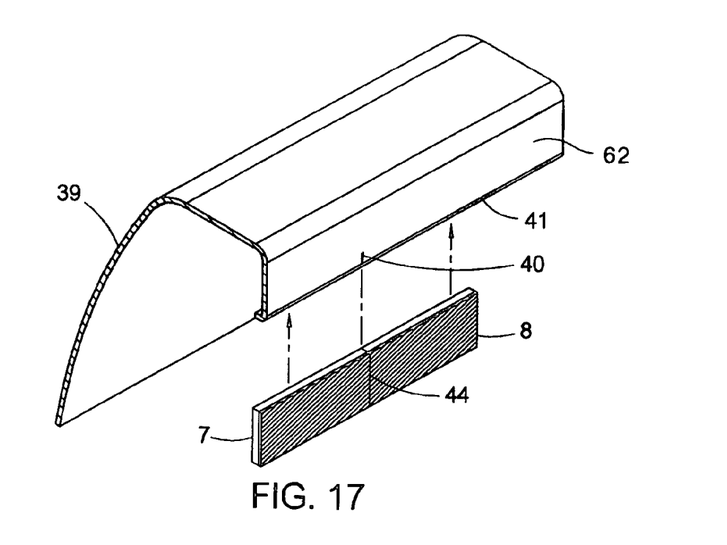
FIG. 17 is a perspective view of a supporting plate 7 of the fastening assembly and a bed rail of the pickup truck of the preferred device shown in FIG. 2.
Figure 19:
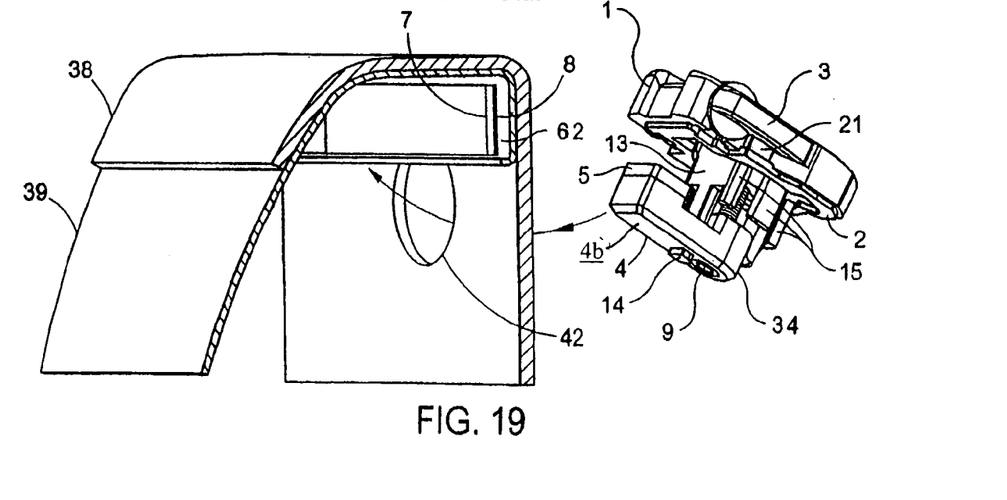
FIG. 19 is a side perspective view of an installation step showing inclining of the fastening assembly for insertion into a hole 42 drilled at the plastic bed liner 38 shown in FIG. 1.
Figure 20:
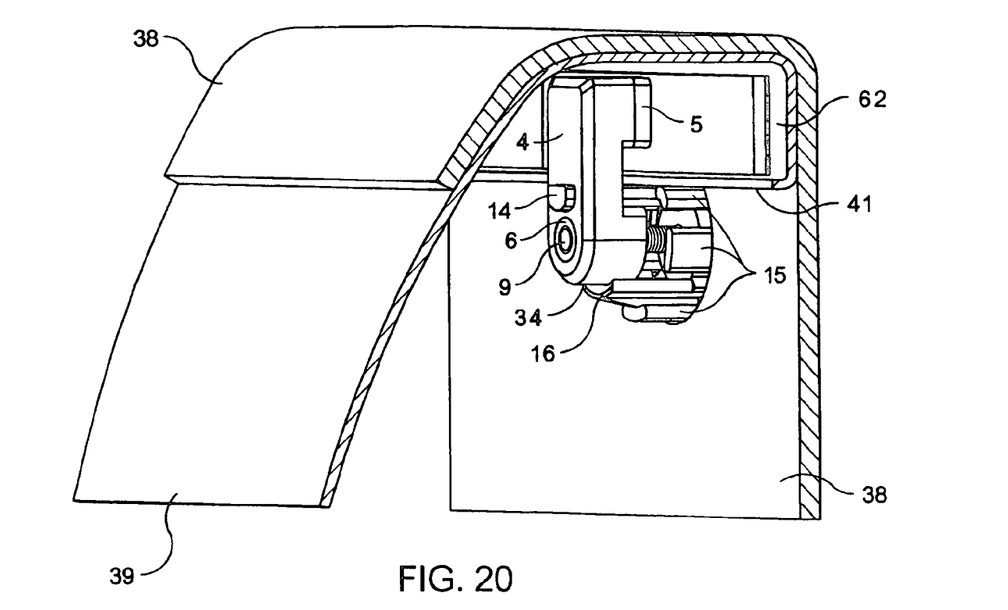
FIG. 20 is a side perspective view of an installation step after inserting the fastening assembly into the hole 42 and setting the fastening assembly upright showing the supporting plate 7, pickup truck bed rail and side wall of the plastic bed liner placed between the clamp member 4 and the base member of the bed liner and fastener assembly shown in FIG. 2.
Figure 21:
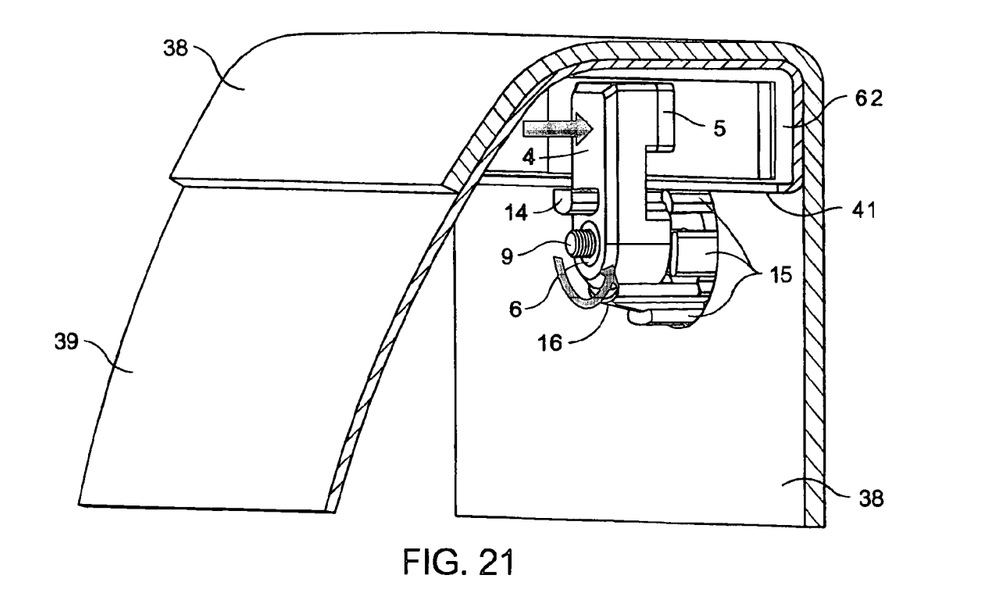
FIG. 21 is a side perspective view showing a rotating direction to fasten a screw of the fastening assembly in order to pull the clamp member linearly to press on the base member of the bed liner and fastener assembly shown in FIG. 2.

The method for installation the fastening assembly pursuant to the preferred embodiment of the present invention involves placing the bed liner 38 with the drilled holes 42 on its side walls on to the pickup truck bed 39. At the intersection of the perimeter of the holes 42 on the bed liner 38 and the lower edge of the bed rail 62 part of the bed rail edge 41 can be seen. A pen is preferably used to make a vertical mark 40 on the edge 41 of the bed rail 62 in alignment with the center of the hole 42. A user ensures that the mark 40 is made in every intersection, both on the left and right walls of the truck bed 39 (FIGS. 16.1 and 16.2). The bed liner 38 is lifted off of the truck bed 39 and the supporting plates 7 are installed at the bed rail 62 by pulling the cover pad of the double-sided tape 8 on the supporting plate 7 and pressing the double-sided tape 8 onto the inner surface of the bed rail 62. A center 44 of the supporting plate 7 is preferably aligned with the vertical mark 40 (FIG. 17). The installation is completed at all positions, both on the left and right walls of the truck bed 39. The bed liner 38 is placed onto the pickup truck bed 39. The foldable tie-down ring assembly is tilted and inserted into the hole 42 on the bed liner 38 (FIG. 19). The tie-down ring assembly is set upright (FIG. 20) and the screw 9 is fastened or tightened such that the bed rail 62 is engaged between the clamp member 4 and base member 1 (FIG. 21). The installation is completed at all positions, both on the left and right walls of the truck bed 39.

Figure 22:
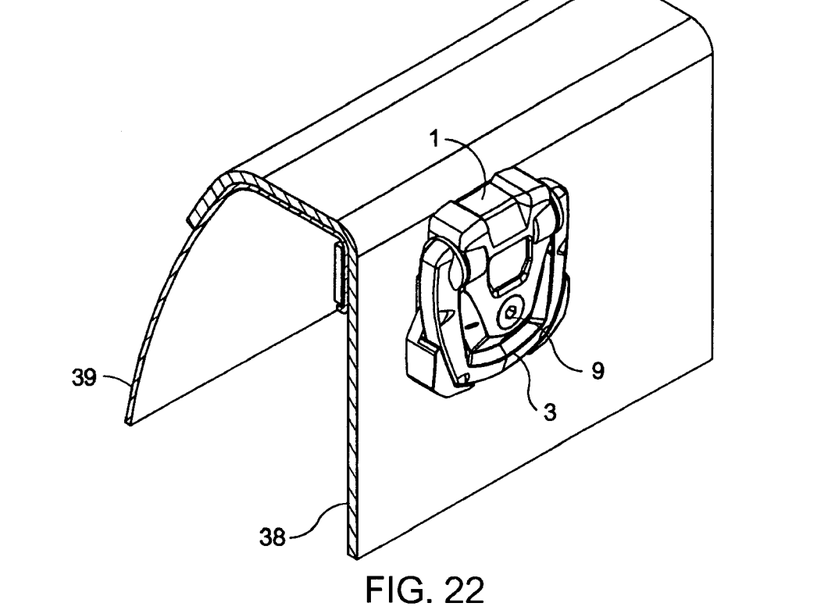
FIG. 22 is a front perspective view of a completely installed fastener assembly relative to a bed liner in a pickup truck bed with the tie-down ring folded to the base member of the bed liner and fastener assembly shown in FIG. 2.
Figure 23:
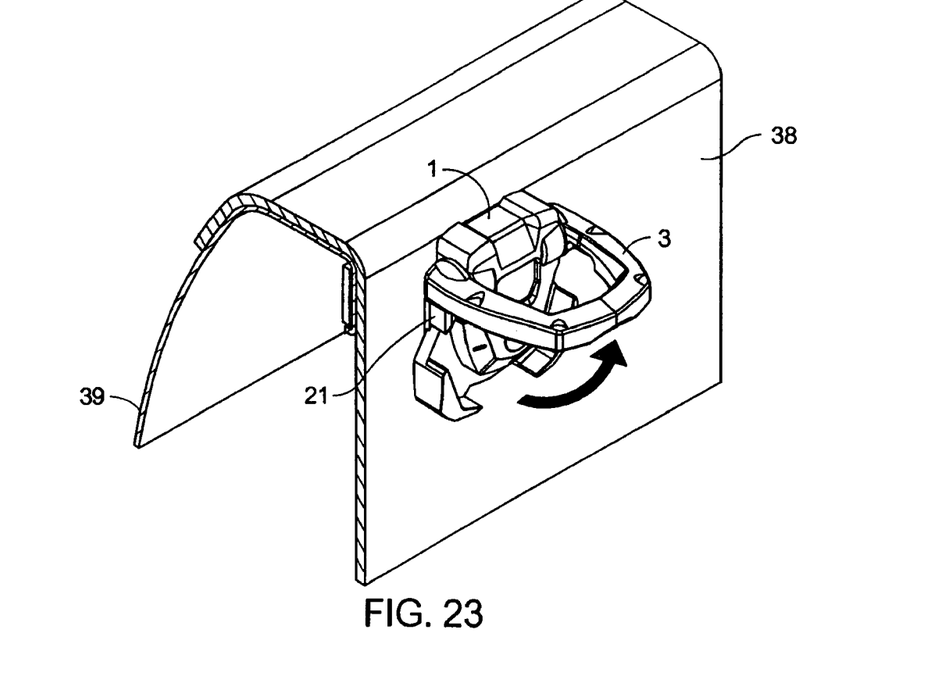
FIG. 23 is a front isometric view of the installed fastener assembly shown in FIG. 22 with the tie-down ring pulled up into a position to engage a rope.
Figure 41:
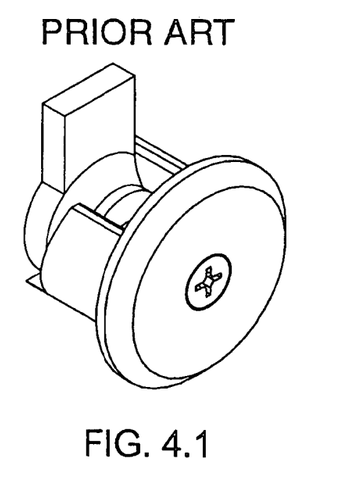
Figure 42:
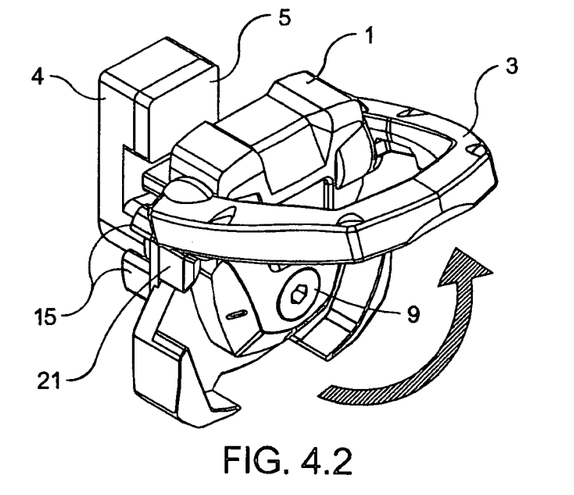

The complete installation of the bed liner 38 to the truck bed 39 using the fastening assembly with tie-down rings 3 is shown in FIG. 22. It should be noted that the tie-down ring assembly fully covers the holes 42 on the bed liner 38.

It will be appreciated by those skilled in the art that changes could be made to the embodiment described above without departing from the broad inventive concept thereof. It is understood, therefore, that this application is not limited to the particular embodiment disclosed, but it is intended to cover modifications within the spirit and scope of the present invention as defined by the appended claims.

We claim:

1. A fastening assembly for securing a bed liner to a truck bed, the truck bed having an inward extended bed rail, the bed liner having at least one hole (42), the fastening assembly comprising:
 a base member (1) for engaging a clamp member (4) through the bed liner hole (42), the base member (1) including a back surface that is pressed by the clamp member (4) with the bed liner wall and the bed rail in between, the base member having at least one extended direction control rod (14) unitarily formed thereon and extending generally perpendicularly from the back surface for insertion through the bed liner hole (42);
 the clamp member (4) having at least one continuous closed cross-sectional through hole (29) for insertion of the extended direction control rod (14) of the base member (1) therein, the hole (29) of the clamp member (4) can be moved along the extended direction control rod (14) of the base member (1) when the clamp member (4) is assembled to the base member (1), the hole extending through the clamp member from a first side to a second side, the first side facing the base member and the second side facing away from the base member in an assembled position, the clamp member able to be inserted through the hole (42) in the bed liner wall when the clamp member (4) is engaged with the base member (1); and
 a tie-down ring for attaching to the base member (1).

2. The fastening assembly of claim 1 further comprising:
 a screw (9) for securing the base member (1) to the clamp member (4).

3. The fastening assembly of claim 2 further comprising:
 a ring (6) installed in an end of an internal threaded hole (31) of the clamp member (4).

4. The fastening assembly of claim 1 further comprising:
 an elastic pad (2) which shall be placed between the back surface and the bed liner wall in the assembled position.

5. The fastening assembly of claim 1 further comprising:
a pad (5) for attaching to the clamp member (4), the pad (5) being constructed of rubber, the pad (5) shall be placed between the clamp member (4) and the inner surface of the bed rail in the assembled position.

6. The fastening assembly of claim 1 further comprising:
a supporting plate (7) for attaching to the inner surface of the bed rail, the supporting plate (7) shall be placed between the clamp member (4) and the inner surface of the bed rail in the assembled position.

7. The fastening assembly of claim 6 further comprising:
a double-sided adhesive tape (8) for attaching the supporting plate (7) to the inner surface of the bed rail.

8. The fastening assembly of claim 6 further comprising:
spring clips for securing the supporting plate (7) to the inner surface of the bed rail.

9. The fastening assembly of claim 1 wherein the base member (1) includes a force absorbing rod (16) extending therefrom to support the lower edge of the clamp member (4).

10. The fastening assembly of claim 1 wherein the direction control rod (14) has a contact plate (13) extending from both sides.

* * * * *